United States Patent
Pourzandi et al.

(10) Patent No.: US 9,912,582 B2
(45) Date of Patent: Mar. 6, 2018

(54) MULTI-TENANT ISOLATION IN A CLOUD ENVIRONMENT USING SOFTWARE DEFINED NETWORKING

(71) Applicants: Makan Pourzandi, Montreal (CA); Mohamed Fekih Ahmed, Montreal (CA); Mohamed Cheriet, Montreal (CA); Chamseddine Talhi, Montreal (CA)

(72) Inventors: Makan Pourzandi, Montreal (CA); Mohamed Fekih Ahmed, Montreal (CA); Mohamed Cheriet, Montreal (CA); Chamseddine Talhi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 107 days.

(21) Appl. No.: 14/546,276

(22) Filed: Nov. 18, 2014

(65) Prior Publication Data
US 2015/0139238 A1 May 21, 2015

Related U.S. Application Data

(60) Provisional application No. 61/905,603, filed on Nov. 18, 2013.

(51) Int. Cl.
*H04L 12/717* (2013.01)
*H04L 12/721* (2013.01)
*H04L 12/801* (2013.01)
*H04L 12/715* (2013.01)
(Continued)

(52) U.S. Cl.
CPC .......... *H04L 45/42* (2013.01); *G06F 9/45558* (2013.01); *H04L 41/042* (2013.01);
(Continued)

(58) Field of Classification Search
CPC ............... G06F 9/45558; G06F 9/5072; G06F 9/44505; G06F 9/44; G06F 2009/45595;
(Continued)

(56) References Cited

U.S. PATENT DOCUMENTS

| 2012/0191754 A1* | 7/2012 | Cecilia Torralba | H04L 29/12132 707/770 |
| 2014/0112142 A1* | 4/2014 | Ko | H04L 49/00 370/235 |

(Continued)

FOREIGN PATENT DOCUMENTS

WO   WO 2014198064 A1 * 12/2014 ......... H04L 12/6418

OTHER PUBLICATIONS

Dushyant Arora, "ProActive Routing in Scalable Data Centers with PARIS," Master's Thesis: Princeton University (Jun. 2013) pp. 1-31.
(Continued)

*Primary Examiner* — Michael Thier
*Assistant Examiner* — Rownak Islam
(74) *Attorney, Agent, or Firm* — David J Rahmer; Ericsson Canada Inc.

(57) ABSTRACT

Systems and methods for ensuring multi-tenant isolation in a data center are provided. A switch, or virtualized switch, can be used to de-multiplex incoming traffic between a number of data centers tenants and to direct traffic to the appropriate virtual slice for an identified tenant. The switch can store tenant identifying information received from a master controller and packet forwarding rules received from at least one tenant controller. The packet handling rules are associated with a specific tenant and can be used to forward traffic to its destination.

29 Claims, 12 Drawing Sheets

(51) Int. Cl.
H04L 12/24 (2006.01)
G06F 9/455 (2018.01)
H04L 12/741 (2013.01)
H04L 29/08 (2006.01)
G06F 9/445 (2018.01)
H04L 29/12 (2006.01)

(52) U.S. Cl.
CPC ............ *H04L 41/044* (2013.01); *H04L 45/44* (2013.01); *H04L 45/64* (2013.01); *H04L 47/12* (2013.01); *G06F 9/44505* (2013.01); *G06F 2009/45595* (2013.01); *H04L 41/5096* (2013.01); *H04L 45/74* (2013.01); *H04L 61/2038* (2013.01); *H04L 61/2596* (2013.01); *H04L 61/6022* (2013.01); *H04L 67/10* (2013.01)

(58) Field of Classification Search
CPC ......... H04L 45/38; H04L 45/00; H04L 45/42; H04L 45/64; H04L 45/745; H04L 47/00; H04L 41/042; H04L 41/044; H04L 47/12; H04L 45/24; H04L 45/44; H04L 41/00; H04L 49/254; H04L 45/74; H04L 61/6022; H04L 61/2038
USPC .................................................. 370/392, 389
See application file for complete search history.

(56) References Cited

U.S. PATENT DOCUMENTS

| | | | | |
|---|---|---|---|---|
| 2014/0153388 A1* | 6/2014 | Webb | ...................... | H04L 47/20 370/230 |
| 2014/0153443 A1* | 6/2014 | Carter | ...................... | H04L 45/54 370/256 |
| 2014/0156720 A1* | 6/2014 | Janakiraman | ........... | H04L 47/28 709/202 |
| 2015/0063351 A1* | 3/2015 | Moreno | ................. | H04L 45/745 370/392 |
| 2016/0099868 A1* | 4/2016 | Tan | ..................... | H04L 12/6418 370/392 |

OTHER PUBLICATIONS

Open Networking Foundation, "OpenFlow Switch Specification," Open Flow: Version 1.3.1 (Wire Protocol 0x04); Sep. 6, 2012; 128 pages.

Zhongjin Liu et al.: "M2cloud: Software Defined Multi-site Data Center Network Control Framework for Multi-tenant," Department of Electronic Engineering, Tsinghua University, Beijing, China (Aug. 2013); pp. 517-518, ISBN: 978-1-4503-2056-6.

PCT International Search Report from corresponding application PCT/IB2014/066132, dated Mar. 19, 2015; 4 pages.

E. L. Fernandes, "ofl3softswitch," https://github.com/CPqD/ofl3softswitch; 4 pages; downloaded from Internet on Sep. 18, 2017.

"nox13:oflib," https://github.com/CPqD/nox13:oflib; 3 pages; downloaded from Internet on Sep. 18, 2017.

Kevin Phemius et al.: "DISCO : Distributed SDN Controllers in a Multi-domain Environment"; 2 pages; 2014 IEEE.

Advait Dixit et al.: "Towards an Elastic Distributed SDN Controller"; 6 pages; Aug. 16, 2013.

M. Sridharan et al.: "NVGRE: Network Virtualization using Generic Routing Encapsulation," 18 pages; Aug. 2013.

M. Mahalingam et al.: "VXLAN: A Framework for Overlaying Virtualized Layer 2 Networks over Layer 3 Networks," draft-mahalingam-dutt-dcops-vxlan-02.txt; 22 pages; May 8, 2011.

Open Networking Foundation (ONF), OpenFlow Switch Specification; Version 1.3.1 (Wire Protocol 0x04); 128 pages; Sep. 6, 2012.

Open Networking Foundation (ONF), OpenFlow Switch Specification; Version 1.3.0 (Wire Protocol 0x04); 106 pages; Jun. 25, 2012.

Open Networking Foundation (ONF), OpenFlow Management and Configuration Protocol (OF-Config 1.1); Version 1.1 117 pages; Jun. 25, 2012.

R. Enns, "Network Configuration Protocol (NETCONF)," Internet Engineering Task Force, RFC, vol. 6241; 113 pages; Jun. 2011.

A. Tootoonchian et al.: "Hyperflow: A Distributed Control Plane for Openflow," in Proceedings of the 2010 internet network management conference on Research on enterprise networking. USENIX Association; 6 pages; 2010.

R. Sherwood et al.: "FlowVisor: A Network Virtualization Layer"; 14 pages; 2009.

A. Tavakoli et al.: "Applying NOX to the Datacenter." in HotNets. Citeseer; 6 pages; 2009.

N. Gude et al.: "NOX: Towards an Operating System for Networks," ACM SIGCOMM Computer Communication Review, vol. 38, No. 3, 6 pages, 2008.

S. Dobson et al.: "A Survey of Autonomic Communications," ACM Transactions on Autonomous and Adaptive Systems (TAAS), vol. 1, No. 2, 37 pages; Dec. 2006.

\* cited by examiner

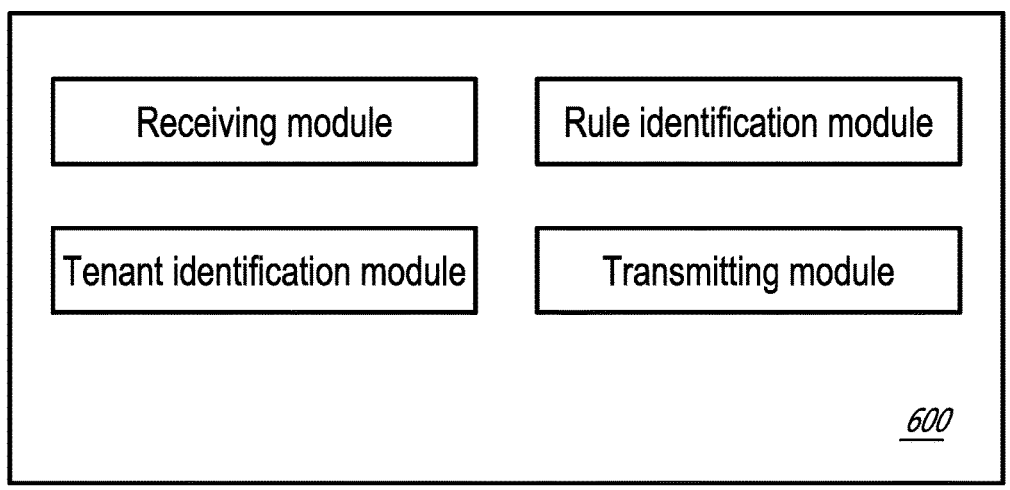

MULTI-TENANT ISOLATION IN A CLOUD ENVIRONMENT USING SOFTWARE DEFINED NETWORKING

CROSS REFERENCE TO RELATED APPLICATIONS

This application claims the benefit of priority to previously filed U.S. Provisional Patent Application No. 61/905,603 entitled "MULTI-TENANT ISOLATION IN A CLOUD ENVIRONMENT USING SOFTWARE DEFINED NETWORKING" and filed on Nov. 18, 2013, the contents of which are incorporated herein by reference.

TECHNICAL FIELD

This disclosure relates generally to systems and methods for providing isolation for tenants in cloud computing.

BACKGROUND

The use of packet-based networking has been growing over time and the growth in traffic demands is increasingly being met by introducing ever larger monolithic routers. However, this model is approaching its technologic and economic limits. It is more and more difficult to fulfill the increasing demand for bandwidth with traditional router designs, and with the emergence of low cost Commercial Off-The-Shelf hardware, router vendors also have difficulty justifying higher costs for the same performance. At the same time, the demands on the routing and switching control plane in the access and aggregation networks are becoming more complex. Operators want the ability to customize packet delivery to handle specific kinds of traffic flows without the detailed low-level configuration typical of today's networks.

These trends suggest a different approach to the network architecture, in which the control plane logic is handled by a centralized server and the forwarding plane consists of simplified switching elements "programmed" by the centralized controller. Software Defined Networking (SDN) is a new network architecture that introduces programmability, centralized intelligence and abstractions from the underlying network infrastructure.

Along with the spread of Cloud Computing, network virtualization is highly used in Data Center networks. The popularity of virtualization results from flexible and efficient management, it makes the infrastructure provider networks more profitable, allows new features and dynamic usage model and helps data center tenants to decrease their capital expenses. In data center networks, virtual network resources such as virtual switches and routers are shared among multiple tenants to reduce physical resources and power costs. Thus, a challenge is to isolate virtual data center networks (vDCNs) of a large number of tenants. In addition to adopting Network Virtualization, as applications get virtualized in virtual machines (VMs), it challenges many aspects of traditional networking Network architectures limitations are realized, especially for big-data workload setting, traffic changing and resources sharing between tenant's vDCNs. In both centralized and distributed architecture, one may have all the privileges to configure each network bandwidth, security-policies (e.g. firewalls), subnets, virtual local area networks (vLANs) and quality of service (QoS). These configuration steps evolve with the complexity of today's networks and make it difficult to apply a consistent set of access controls and implement a network-wide isolation.

Typically, tenants are not given full access control over virtual routers or switches which are operated by the service provider/data center operator in their multi-tenant vDCNs. Providing transparency and self-management for multi-tenant vDCNs represents a need which must be preceded by performance isolation to be realizable. It is widely accepted that the network of the future will require a greater degree of service awareness and optimal use of network resources. It is becoming primordial that future networks should be both self-controlled and management-aware, which includes the scale in/out of network domains.

Creating "virtual slices" is an issue that has not been completely resolved prior to the introduction of SDN mechanisms such as OpenFlow. OpenFlow is a standard protocol between the control and forwarding planes used in SDN applications. OpenFlow was initially designed for Ethernet-based forwarding engines, with internal flow tables and a standardized interface to add and/or remove flow entries. The flow tables specify how the switch should process packets, with an entry of actions associated with each flow. The OpenFlow protocol provides an open and standard method for an OpenFlow switch to communicate with an SDN controller.

SDN concepts have gained attention due to their flexibility for creating separate and independent virtual networks on top of physical network infrastructures. SDN mechanisms enable the dynamic configuration of an entire network using a control brain in an open approach, and this flexibility by decoupling the control and data planes is beneficial for cloud data center networks consisting of many virtual switches/routers, computing nodes, and users' virtual machines. OpenFlow enhances network flow control by allowing a fine manipulation of each incoming packet to determine the forwarding port on-the-fly based on dynamically set flow rules and altering destination address or path.

SDN implementations to date have made use of a single centralized or distributed controller to achieve architecture isolation between different customers, but without solving networks scalability bottlenecks and arriving at a consistent solution to solve vDCN isolation and highly flexible scaling collaboration. A tenant's vDCNs needs to be scalable, on-demand and orchestrated.

Therefore, it would be desirable to provide a system and method that obviate or mitigate the above described problems.

SUMMARY

It is an object of the present invention to obviate or mitigate at least one disadvantage of the prior art.

In a first aspect of the present invention, there is provided a method for processing packet traffic in a multi-tenant network. A packet is received. Responsive to determining that a tenant associated with the received packet cannot be determined, tenant information is requested from a first controller. The requested tenant information is received from the first controller. Responsive to determining that a forwarding rule associated with the received packet cannot be determined, the forwarding rule is requested from a second controller. The requested forwarding rule is received from the second controller. The packet is transmitted in accordance with the received forwarding rule.

In a second aspect of the present invention, there is provided a switch in a multi-tenant network comprising a processor and a memory. The memory contains instructions executable by the processor whereby the switch is operative to receive a packet. Responsive to determining that a tenant associated with the received packet cannot be determined, the switch requests tenant information from a first controller. The switch receives the requested tenant information from the first controller. Responsive to determining that a forwarding rule associated with the received packet cannot be determined, the switch requests the forwarding rule from a second controller. The switch receives the requested forwarding rule from the second controller. The switch transmits the packet in accordance with the received forwarding rule.

In another aspect of the present invention, there is a provided a switch comprising a receiving module, a tenant identification module, a rule identification module, and a transmitting module. The receiving module is for receiving a packet. The tenant identification module is for requesting tenant information from a first controller in response to determining that a tenant associated with the received packet cannot be determined, and for receiving the requested tenant information from the first controller. The rule identification module is for requesting a forwarding rule from a second controller in response to determining that the forwarding rule associated with the received packet cannot be determined, and for receiving the requested forwarding rule from the second controller. The transmitting module is for transmitting the packet in accordance with the received forwarding rule.

In some embodiments, the first controller is a master software defined networking (SDN) controller associated with a plurality of tenants in the multi-tenant network. In some embodiments, the second controller is a tenant software defined networking (SDN) controller associated with the tenant.

In an optional embodiment, the tenant information can be a tenant table identifier.

Some embodiments can include performing a first table lookup to select a tenant table identifier associated with the received packet from a master table. The first table lookup can be performed in accordance with an input port on which the packet was received.

In some embodiments, the step of requesting tenant information includes sending the received packet to the first controller. In some embodiments, the received tenant information can be stored in a master table.

Some embodiments can include performing a second table lookup to select the forwarding rule associated with the received packet from a tenant table associated with the tenant. The second table lookup can be performed in accordance with at least one header field of the received packet. The at least one header field can be selected from a group comprising: a source IP address, a destination IP address, a source port, a destination port, and a protocol.

In some embodiments, the step of requesting the forwarding rule from a second controller includes sending the received packet to the second controller. In some embodiments, the received forwarding rule can be stored in a tenant table associated with the tenant.

There various aspects and embodiments described herein can be combined alternatively, optionally and/or in addition to one another.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 12 is a block diagram of an example switch.

DETAILED DESCRIPTION

Figure 1:
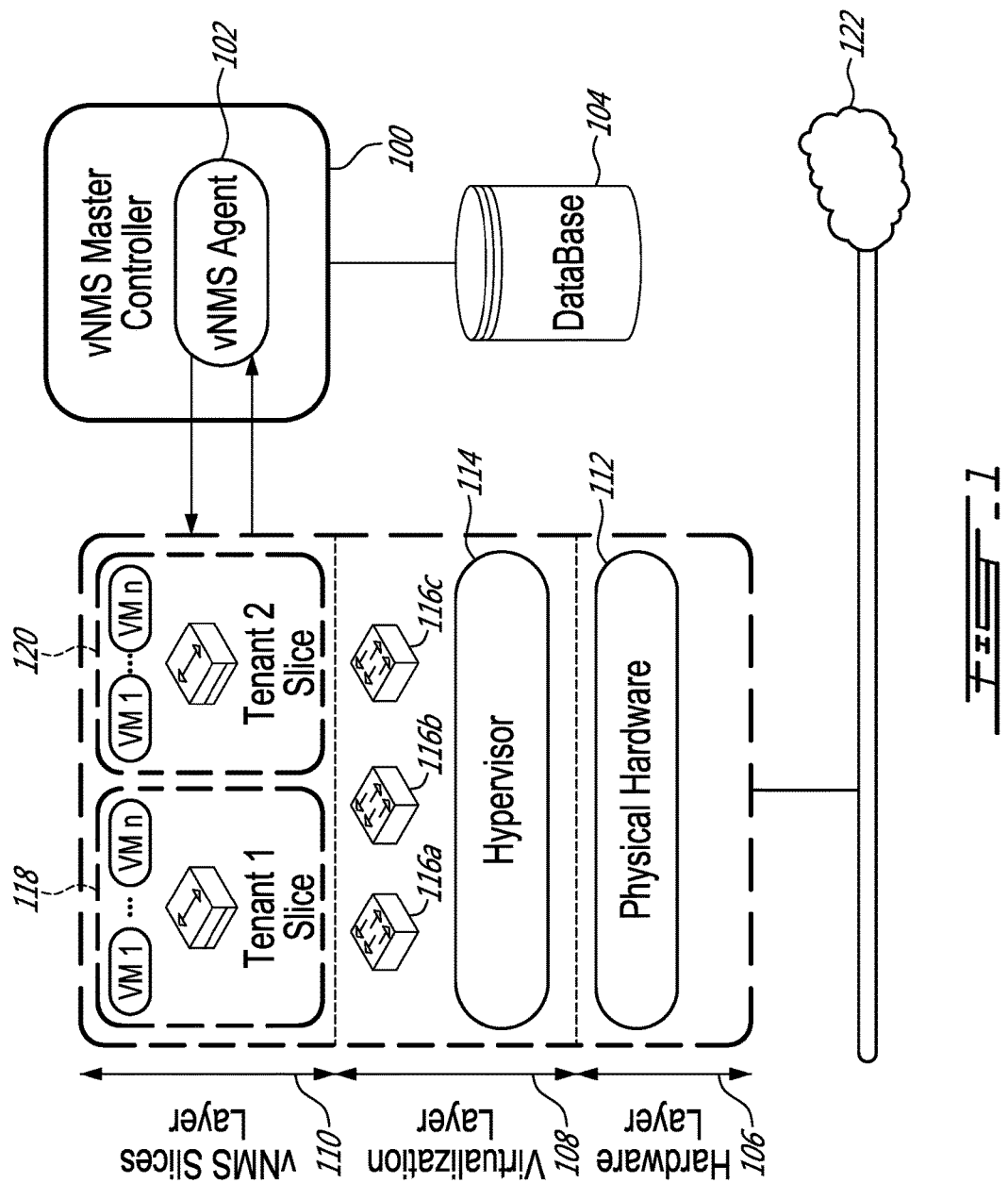
FIG. 1 illustrates a high-level view of an exemplary virtual Network Management System (vNMS) architecture.

The present disclosure is directed to systems and methods for providing multi-tenant isolation in a data center.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Based on SDN flexibility, some embodiments of the present invention will provide a mechanism at the SDN control plane to provide an elastic Layer 2 (L2) isolation for multi-tenants vDCNs. By adding an autonomic management plane, the complexity of management operations can decrease and provide a self-aware and automatic configuration of the OpenFlow flow entries in the switching elements. A virtual Network Management System (vNMS) architecture will be described that groups VMs belonging to a specific tenant, distributed across physical networks into virtual vDCNs, in which customer isolation requirements are automatically enforced. These changes can be transparent to the tenant(s). The autonomic aspect of vNMS is to provide the multi-tenancy isolation in an automatic and transparent way for the tenants at L2.

"Autonomic" computing refers to the self-managing characteristics of distributed computing resources, adapting to unpredictable changes while hiding intrinsic complexity to operators and users. Autonomic computing is an approach that can be complementary to SDN by evolving the self-control and self-management of the network. A self-managing network can help in overcoming the rapidly growing complexity of data center networks and enable their further growth far beyond the size of today. Autonomic management includes a range of self-discovery, awareness, and analysis capabilities that provide a view on high-level state. An objective of introducing these autonomic attributes into a network is to give the management privilege for allocated resources to the tenant, to decrease the network complexity and to minimize manual network configuration.

The SDN architecture can be enhanced by adding self-awareness capabilities. A tenant's vDCN could reconfigure itself according to the desired needs or the recommended changes for security or load balancing purposes, for example. SDN architecture could build a specified application network by self-configuration in tenant's vDCNs and self-organization in DCNs. Autonomic communication improves the intelligence of the network control brain by providing these self-attributes and improving efficiency of the SDN management functions.

Connectivity management at L2 is preferred as it is much faster than an overlay L2 on top of L3 (L2oL3) network (e.g. VXLAN). In a use case example, one vDC runs in two geographically-separated sites (i.e. two vDC partitions). One partition runs the active application instance and the other partition runs the standby application instance. It would be desirable to be able to switch, at L2, the traffic from partition 1 to partition 2 if application instance active in vDC partition 1 crashes. For this, managing the connectivity at L2 is required. Also, in service chaining based on SDN, there is a need for L2 configuration of the connectivity between different VMs. The overlay network solutions based on L2/L3 technology provides a much higher latency time.

In industrial virtual networking implementations, the transport is provided by the physical network and the VM service is provided by the hypervisors. Virtual networks are constructed on the top of the transport network. A conventional approach to providing tenant isolation is to use VLAN, which lacks scalability. Multiple Overlay Virtual Networks (OVN) technologies are known as substitutes for VLAN for providing multi-tenancy isolation. These technologies can typically use Open vSwitch plus standard (L2/L3) physical switching to provide virtual networking isolation and tunneling. Examples include VMware's vCloud Director Networking Infrastructure (vCDNI), Cisco's VXLAN, HP's NVGRE, and Nicira's Network Virtual Platform (NVP). Table I shows a comparison of the features of these solutions.

with the others. This approach does not consider the tenant vDCN scalability which is restricted by the allocated resources (VMs, OpenFlow Ports, OpenFlow Tables, etc.).

HyperFlow has a complementary approach. It introduces the idea of enabling the interconnection between separated OpenFlow networks. HyperFlow uses multiple controllers to manage each tenant vDCN similar to FlowVisor. The connection between tenant vDCNs is provided by a shared publish/subscribe system which the controllers use to update the network state and send commands to the other controllers.

The HyperFlow design does not support routing over tenant vDCNs or network scalability. It represents important overhead in the packet processing and degrades overall network performance.

Cabuk and al. (S. Cabuk, C. I. Dalton, K. Eriksson, D. Kuhlmann, H. V. Ramasamy, G. Ramunno, A.-R. Sadeghi, M. Schunter, and C. Stuble, "Towards automated security policy enforcement in multi-tenant virtual data centers," Journal of Computer Security, 2010) have presented a prototype of automated security policy enforcement in multi-tenant virtual data centers based on the concept of Trusted Virtual Domains (TVD). This solution offers tenants separation using VLAN, EtherIp and VPN tagging. TVD addresses intra-TVD communication but not inter-TVD communication and requires new functionalities in SDN to implement an elastic enforcement layer.

FortNOX is an extension to the open source NOX OpenFlow Controller that incorporates a live rule conflict detection engine of flow rules requests from an OpenFlow application to enable, reprogram and correct virtual switch rules. FortNOX addresses rule conflicts but does not support automatic and transparent isolation between different tenants' vDCNs.

Multi-tenancy logical isolation in DCNs has long been a goal of the network research and industrial community. With SDN emerging as a key mechanism for rapid controlling and flexible management of network switches, multiple independent and isolated virtual networks each with potentially different and heterogeneous addressing, forwarding and

TABLE I

Comparison of industrial vDCN implementations

| Technology | Encapsulation | Control Plane | VLAN limit | Bridging | VM MAC visible | vNet Flooding | Multicast Flooding | State maintain in network |
|---|---|---|---|---|---|---|---|---|
| VXLAN | L2-over-UDP | X | X | X | X | ✓ | Some | IP Multicast |
| NVGRE | MAC-over-IP | X | X | X | X | ✓ | ✓ | ✓ |
| vCDNI | MAC-to-MAC | X | X | ✓ | X | ✓ | ✓ | Hypervisors' MAC |
| Nicira NVP | MAC-over-IP | ✓ | X | X | X | Some | X | X |

Several approaches related to the concept of multi-tenant vDCN isolation using SDN network have been proposed.

FlowVisor is a project working on developing virtual network slicing in a hardware programmable router. A goal of FlowVisor is to implement an OpenFlow proxy to allow multiple researchers use the same network resources using multiple controllers. Such mechanisms aim to separate tenants' slices called "flowspaces" and allow each slice to be managed by a single controller.

With FlowVisor, the instantiation of the entire SDN topology is non-automatic and non-trivial, as it involves important overhead such as installing auxiliary flow entries for tunneling and enforcing flow table isolation. These slices are completely independent; each one does not communicate tunneling mechanisms can share the same physical infrastructure. At the same time, tenants desire transparent isolation and full control for their programmable network slices enabling the deployment of arbitrary network services and cross-slices communication. Furthermore, providing customers transparent isolation according to high-level security policies specifications and inter-domains collaboration are among the most challenging objectives. At the core of these challenges is the correct configuration of all Switches and Controllers to arrange L2 elastic isolation between multi-tenants DCNs.

As previously discussed, SDN provides an architecture that decouples the control plane and data plane as well as a programmable data-plane with on demand flow policy services. In DCNs, software-defined virtual switching capabilities offer highly flexible scaling of the control plane. However, current architectures rely completely on the use of a single centralized controller (or distributed controllers acting as a single logical entity) to manage all network switches and neglect the management plane, which has major drawbacks including lack of scalability or cross domain communication. Embodiments of the present disclosure provide a hybrid architecture based on SDN and autonomic computing which can improve network management capabilities to add the self-control and management to the L2 isolation to address both network/node and control plane scalability bottlenecks.

Some embodiments of the present invention will be described as using the OpenFlow protocol, but it will be appreciated that they can also be implemented with other types of SDN protocols. OpenFlow is a communications protocol that gives access to the forwarding plane of a network switch or router over the network.

In various embodiments, the network forwarding or switching element will be described as a switch, a virtual switch (Open vSwitch or OVS), or an OpenFlow switch. The switching element can be a physical switch or a virtual switch with underlying physical hardware. Those skilled in the art will readily understand that this terminology can be used interchangeably.

In some embodiments, the vNMS architecture will be described as an autonomic design to provide L2 isolation, self-control and management with particular regard to virtual multi-tenant DCNs. vNMS can enable not only L2 isolation, but also upper-layer functions like application firewall in the same manner.

FIG. 1 illustrates a high-level view of an exemplary vNMS architecture. A vNMS Agent 102 is shown as part of the vNSM Master Controller 100. The Master Controller 100 acts as the SDN controller for the virtual network. The vNMS Agent 102 is responsible for managing the distribution of configuration and policy information. Database 104 stores the VM membership information and acts as a repository for all tenant and network information. FIG. 1 also illustrates an example of the logical layers of a vDC—hardware layer 106, virtualization layer 108, and vNMS slices layer 110. Hardware layer 106 includes the underlying physical hardware 112 (e.g. CPU/memory in switches, servers, blades) of the data center. Virtualization layer 108 includes hypervisors 114 for managing virtual resources and virtual switches 116a, 116b, 116c. The vNMS slices layer 110 can be thought of as a second virtualization layer, showing the virtual resources portioned into "slices". It includes the tenant virtual slices, Tenant 1 Slice 118 and Tenant 2 Slice 120. Each tenant slice can include a number of virtual machines VM1-VMn as well as virtual forwarding elements. The vDC can connect to an outside network 122 such as the Internet. Although many of the blocks of FIG. 1 are shown as separate logical entities, they can optionally be implemented in a single physical structure.

Figure 2:
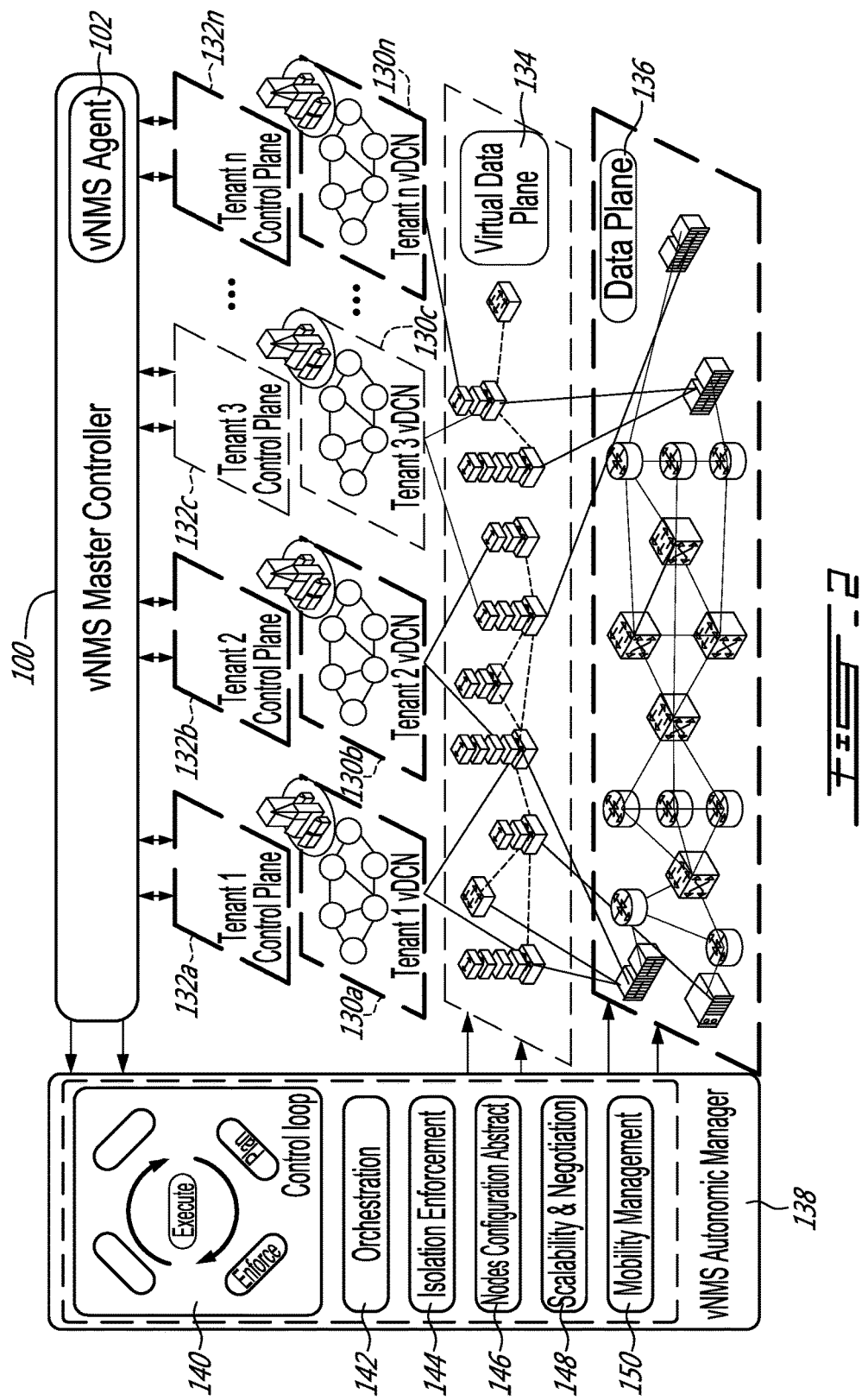
FIG. 2 illustrates a detailed view of an exemplary vNMS architecture.

FIG. 2 illustrates a more detailed view of the components included in the example vNMS architecture. A number of tenant vDC networks are shown as 103a-130n. The vNMS Master Controller 100 and vNMS Agent 102 serve as a master control plane to provide the overall management of the different tenants. Each tenant is provided with its own control plane 132a-132n, which can be considered its own abstract SDN controller. For example, the vNMS Agent 102 can synchronize the behavior among these different tenant SDN controllers 132a-132n, establishing different VPN tunnels between different data center sites for the communications between different vDC partitions, and so on. Each tenant SDN controller 132a-132n manages its own virtual slice in different switches without interfering with the resources from other tenant vDCs.

As illustrates, the Tenant vDC networks 130a-130n map to the virtual data plane 134 which comprises a number of virtual switching elements. The virtual data plane 134, in turn, maps to the data plane 136 which comprises the underlying physical hardware of the data center(s).

A vNMS Autonomic Manager entity 138 is also illustrated with a number of applications for managing the data center network. vNMS Autonomic Manager 138 can include a control loop module 140, an orchestration module 142, an isolation enforcement module 144, a node configuration abstraction module 146, a scalability and negotiation module 148, a mobility management module 150, and others.

This framework can provide orchestration of different L2 layer rules to each tenant SDN controller 132a-132n. Insolation can be enforced as the L2 forwarding tables can only be accessed by the connected tenant SDN controllers 132a-132n. A layer of abstraction at L2 can be provided for the different tenants. The framework also provides means to scale up and down transparently, as the forwarding rules allow to connect or disconnect different vDCNs created for the same tenant or different tenants. L2 layer forwarding rules can be enforced as VMs move from one host to another.

The vNMS Agent 102 can be an OpenFlow application as an extension to OpenFlow Controller 1.3. It is located in control plane layer. It is responsible for isolating tenant slices by verifying incoming packets. The vNMS Autonomic Manager 138 can enable an advanced and enriched self-manageability of the SDN network which is realized through a number of control loops into the control plane. It is a planning, analyzing, orchestration and provisioning entity. It also represents a component which verifies the identity of the network nodes requesting to join a specific customer zone or sharing specific resources.

The vNMS Agent 102 can be designed as an application of a software switch based on extensible packet matching and pipeline processing of packet traffic. The OpenFlow pipeline can be divided into multiple sub-pipelines or flow tables. The pipeline processing will always start at the designated first flow table. In other words, an incoming packet is first lookedup and matched against the entries of Table 0 (i.e. the master table). The vNMS Master Controller 100 (via vNMS Agent 102) is configured to populate the Table 0 entries on each virtual switch in the virtual data plane 134. The virtual slicing model discussed is thus translated into the entries of the master table in each switch. The remaining flow tables can be allocated to a specific tenant or shared between multiple tenants/slices. As such, in some embodiments, the master table is used as a de-multiplexer which dispatches incoming packets to different tenant slices. The extensible packet matching and the pipeline feature can also be used to provide L2 isolation.

Figure 3:
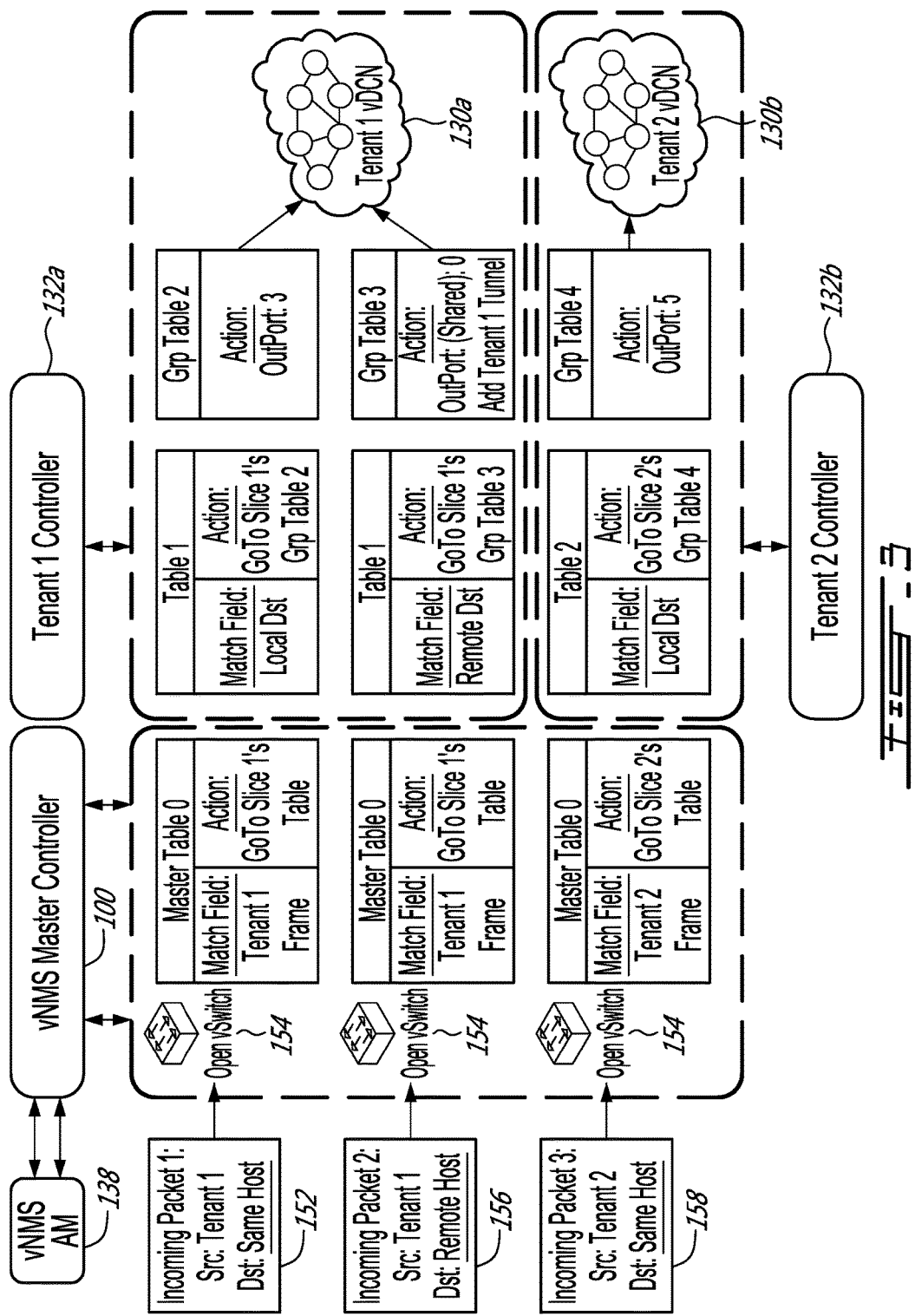
FIG. 3 illustrates an example of table re-direction.

FIG. 3 illustrates a table pipelining process that can occur in a switching element, for example Open vSwitch 154. The vNMS Master Controller 100 is shown as responsible for managing Master Table 0 stored in switch 154. Tenant 1 Controller 132a is shown as managing the Tenant 1 tables stored in switch 154, and similarly Tenant 2 Controller 132b manages the Tenant 2 tables stored in switch 154. For each tenant slice, there are flow tables which can be used for intra-slice forwarding. When there is an incoming packet in Table 0, it can be re-directed to a specific tenant table depending as appropriate.

In a first example, incoming Packet 1 152 is received by switch 154. A lookup is performed on Table 0 to determine that the packet should be directed to the Tenant 1. The field used for the lookup can be the packet's input port, source address or other parameter. Packet 1 152 is pipelined to Table 1 for processing. A lookup is performed on Table 1 and a next action is determined. It should be noted that the next action for a table lookup match can include being "forwarded" to a subsequent table for processing. It will be readily understood by those skilled in the art that the packet is not physically "forwarded" to another switch or entity, but pipelined to a subsequent table in the same switch for processing. Packet 1 152 is subsequently pipelined to Group Table 2 where the action is determined to be to transmit the packet on port 3.

In a second example, incoming Packet 2 156 is received by switch 154. A lookup on Table 0 determines that Packet 2 156 belongs to Tenant 1's slice and should be forwarded to Table 1. A lookup on Table 1 determines that Packet 2 156 should be forwarded to Group Table 3. A lookup on Group Table 3 determines that Packet 2 156 should be transmitted on shared output port 0.

In another example, incoming Packet 3 158 is received by switch 154. A lookup on Table 0 determines that Packet 3 158 belongs to Tenant 2's slice and should be forwarded to Table 2. A lookup on Table 2 determines that Packet 3 158 should be forwarded to Group Table 4. A lookup on Group Table 4 determines that Packet 3 158 should be transmitted on port 5.

Figure 4:
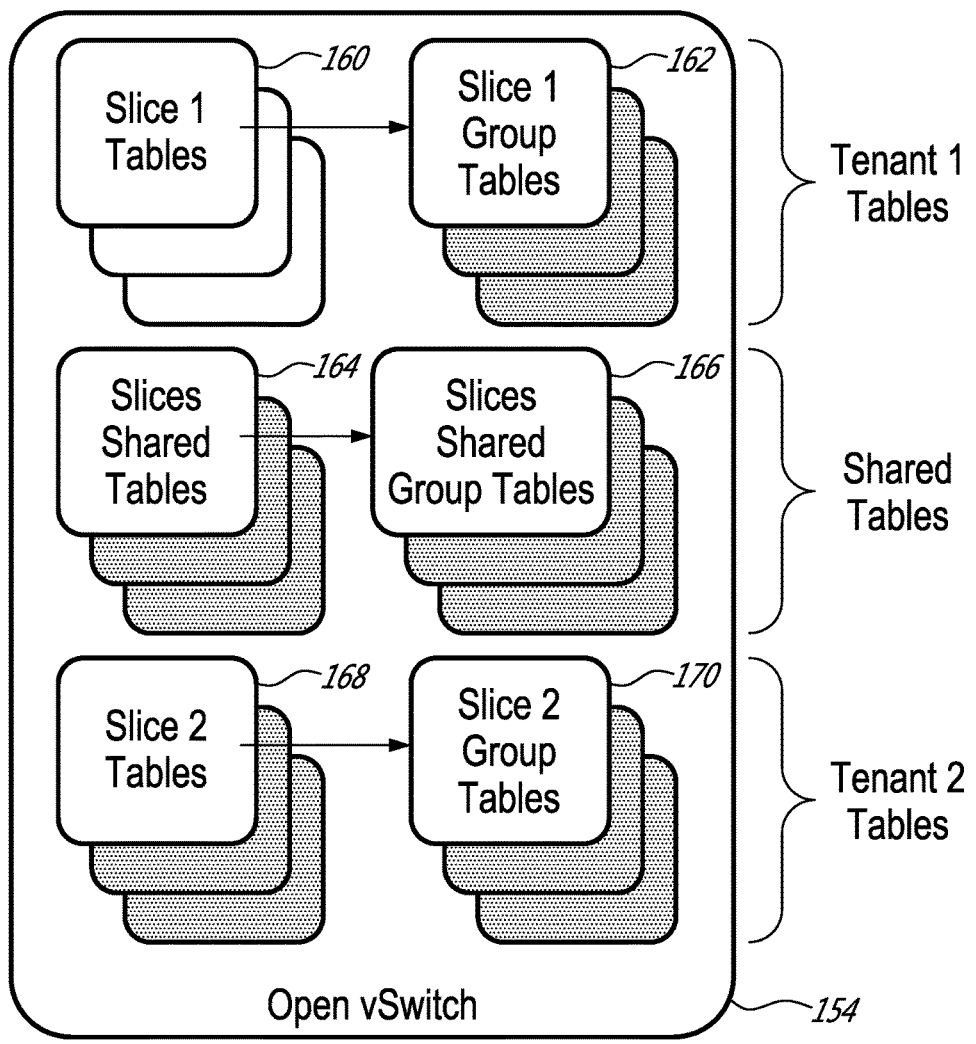
FIG. 4 illustrates a table slicing model.

It will be appreciated that in the examples of FIG. 3, Master Table 0 can be considered a shared table between Tenant 1 and Tenant 2. The remaining tables are specific to their respective tenant and isolated from the other tenant networks in the vDC. This concept is further shown in FIG. 4 which illustrates a table slicing model. Tenant 1 tables include the set of Slice 1 Tables 160 (e.g. Table 1 from FIG. 3) and Slice 1 Group Tables (e.g. Grp Table 2 and Grp Table 3 from FIG. 3). The Shared Tables can include the set of Slices Shared Tables 164 (e.g. Master Table 0 from FIG. 3) and Slices Shared Group Tables 166. Tenant 2 tables include the set of Slice 2 Tables 168 (e.g. Table 2 from FIG. 3) and Slice 2 Group Tables 170 (e.g. Grp Table 4 from FIG. 3).

It will also be appreciated that in the examples of FIG. 3, each table lookup resulted in a successful match and resulting action for the packet. In some embodiments, the tables stored in switch 154 may not necessarily be pre-configured with full packet handling information. In such a case, when there is no match made on a table lookup, the switch 154 may need to request further information from the Master Controller 100 or the appropriate Tenant Controller 132a or 132b.

(block 202). If there is no match in the Master Table, the frame can be sent to the Master Controller or it will be dropped (block 204). If there is a match, the frame is re-directed towards the proper tenant (block 206). The frame is then compared to the Tenant Table which defines the appropriate action for the frame and will set a next destination for the frame (block 208). If there is no match in the Tenant Table, the frame can be sent to the appropriate Tenant Controller or it will be dropped (block 210).

The next destination is determined to be local or remote (block 212). If the destination is remote, the frame is directed to the Shared Table to forward the frame to a virtual switch output port to connect to the appropriate physical NIC (block 214).

If the target destination is local (i.e. on the same host or data center), then a determination is made to verify if the source and destination VMs of the frame belong to the same Tenant vDC (block 216). If no, the frame is dropped. If yes, the appropriate output port in the slice definition is searched for (block 218). If found, the slice file is parsed and the output port is determined. The flow entry can then be installed in the virtual switch at the destination VM's tenant.

In the embodiments described herein, multi-tenant data centers can provide customers with given dedicated resources such as virtual storage, virtual network and VMs. A secure sharing mechanism is enabled by preventing unauthorized traffic and information leak. A slicing model based on OpenFlow is introduced as a security mechanism for enforcing unified security policies and isolation in virtualized data centers. It can allow for an efficient utilization of the virtual switching element resources (I/O interfaces, queues) of the slices and reduce virtualization costs. The slicing model provides a logical separation of a multi-tenant datacenter. A tenant can define common policies, also referred to as mutual policies. OpenFlow software switch resources can be sliced to ensure the desired security and isolation properties within each virtual slice while managing shared services under mutually agreed policies.

In some embodiments, the slicing model can consist of four different slicing types $Sl_0$, $Sl_1$, $Sl_2$, $Sl_3$, depending on the virtualsSwitch's resources (vPorts, OpenFlow Tables and Group Tables). Terms of isolation can be provided for specific operator and/or customer requirements in performance and flexibility between the slices. Each type combines these resources to guarantee flexibility. It may generate negligible overhead which does not affect virtual switch and network performance. Table II details the four slicing types as denoted by $Sl_i$.

TABLE II

| Open vNMS Slicing Types | | | | |
|---|---|---|---|---|
| Open vNMS Slicing Types | Open vNMS Master Tables | Isolated Open vSwitch Tables | Isolated Open vSwitch Ports | Isolated Open vSwitch Group Tables |
| Open vNMS $Sl_0$ | X | X | X | X |
| Open vNMS $Sl_1$ | ✓ | X | ✓ | X |
| Open vNMS $Sl_2$ | ✓ | ✓ | X | X |
| Open vNMS $Sl_3$ | ✓ | ✓ | ✓ | ✓ |

Figure 5:
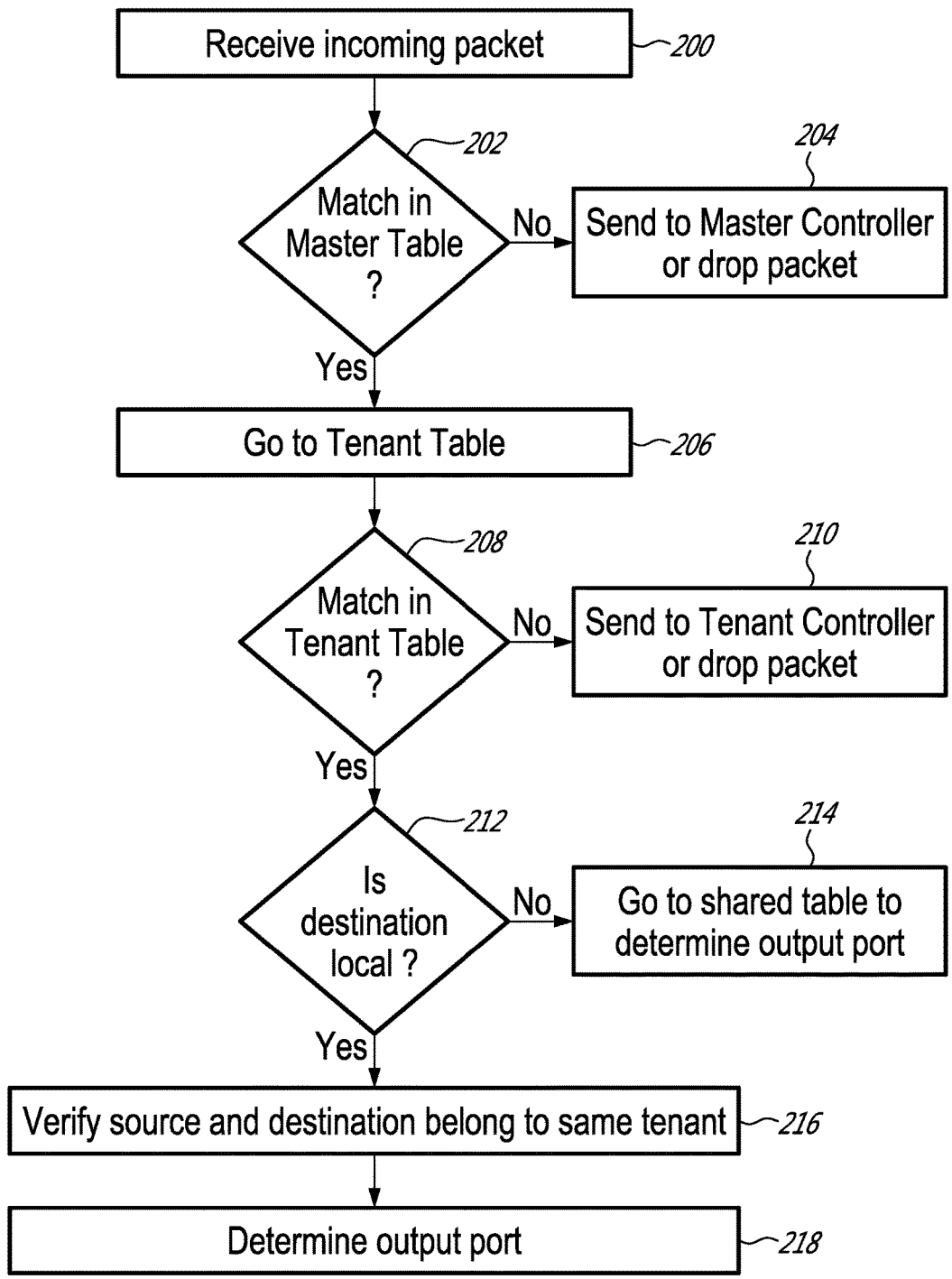
FIG. 5 illustrates a method for packet handling.

FIG. 5 illustrates a method for packet handling in vNMS. An incoming packet or frame is received at an ingress port of a switch (block 200). The received frame is first compared to the Master Table to determine which tenant it belongs to A vNMS tenant can have full control of their dedicated ports and attached queues features. However, as the number of virtual ports in a virtual switch linked to physical interface (NIC) is limited, virtual interfaces between slices need to be shared to decrease the number of vPorts bridged to the NIC. When interfaces are shared, their status and features can be controlled by a Network administrator to prevent information leakages and to protect customer privacy.

Sharing tables can reduce memory consumption. For example, two slices belonging to the same customer that share a VM as mutually trusted shared resources can share an input port of the VM, the output port of the virtual switch connected to that VM and/or a forwarding table dedicated to shared flow.

Figure 6:
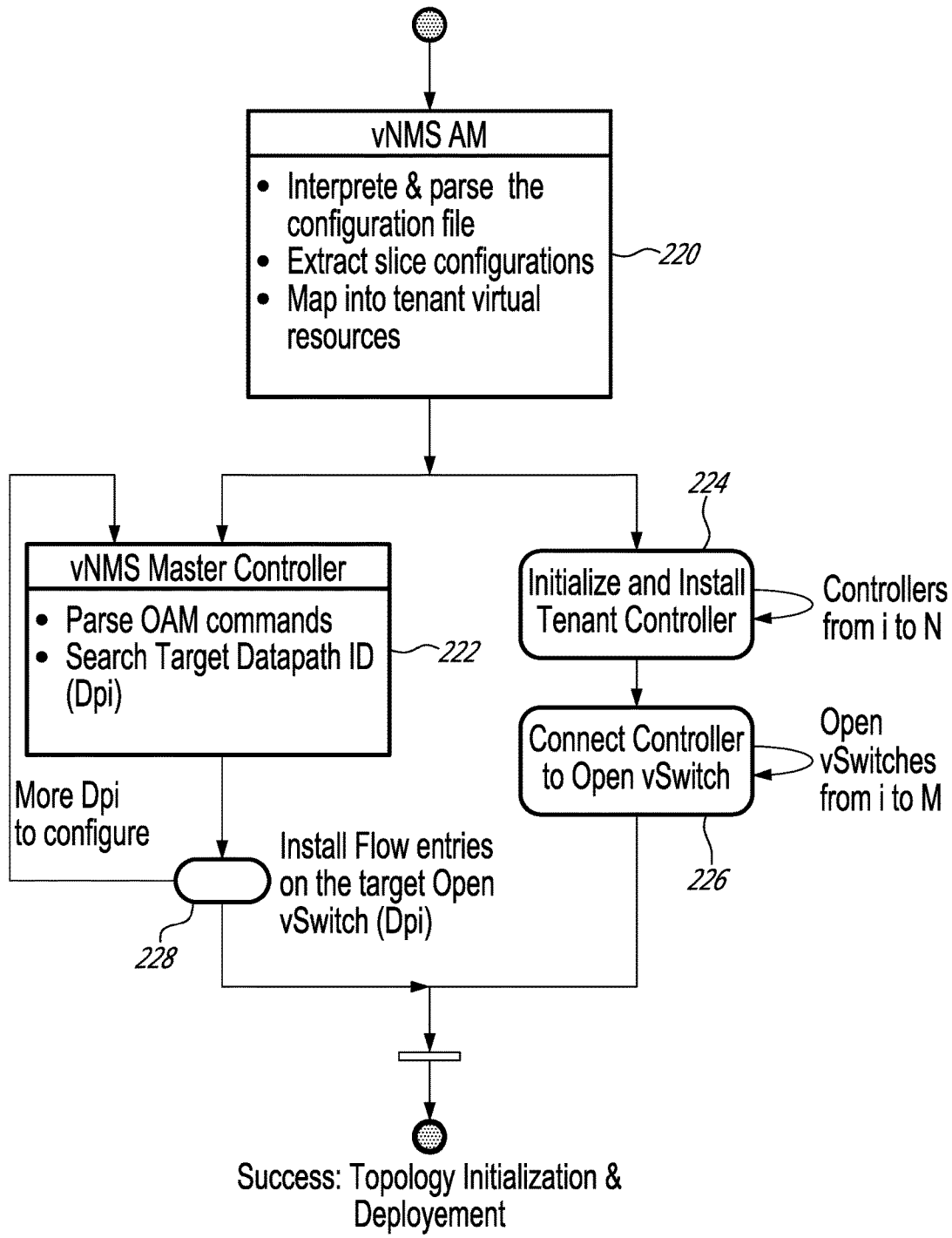
FIG. 6 illustrates an example vNMS global topology deployment.

FIG. 6 illustrates a description of an example vNMS global topology deployment. The vNMS Autonomic Manager (vNMS AM) receives a global topology description as input. The vNMS AM is configured to interpret and parse the virtual slice configuration file, extract slice configurations and map the tenant to virtual resources (block 220). The virtual slice configuration file can be formatted as a JavaScript Object Notation (json) file, or any other applicable format. Open vNMS security policies can be enforced based on SDN. The vNMS AM outputs information for both the Master Controller and Tenant Controller(s).

The tenant controllers can be initialized and installed (block 224). This can be repeated for each tenant specified in the configuration. The initialized tenant controller(s) can then be connected to the Open vSwitch(es) (block 226). Again, this can be repeated as required for each Open vSwitch.

Information is also sent to the Master Controller. The vNMS Master Controller is configured to parse the Operation and Management commands and to search the target datapath ID (Dpi) (block 222). Flow entries can be installed on each Open vSwitch (Dpi) (block 228). The topology initialization and deployment is a success following the completion of initialization actions at both the Master Controller and Tenant Controller(s).

Figure 7:
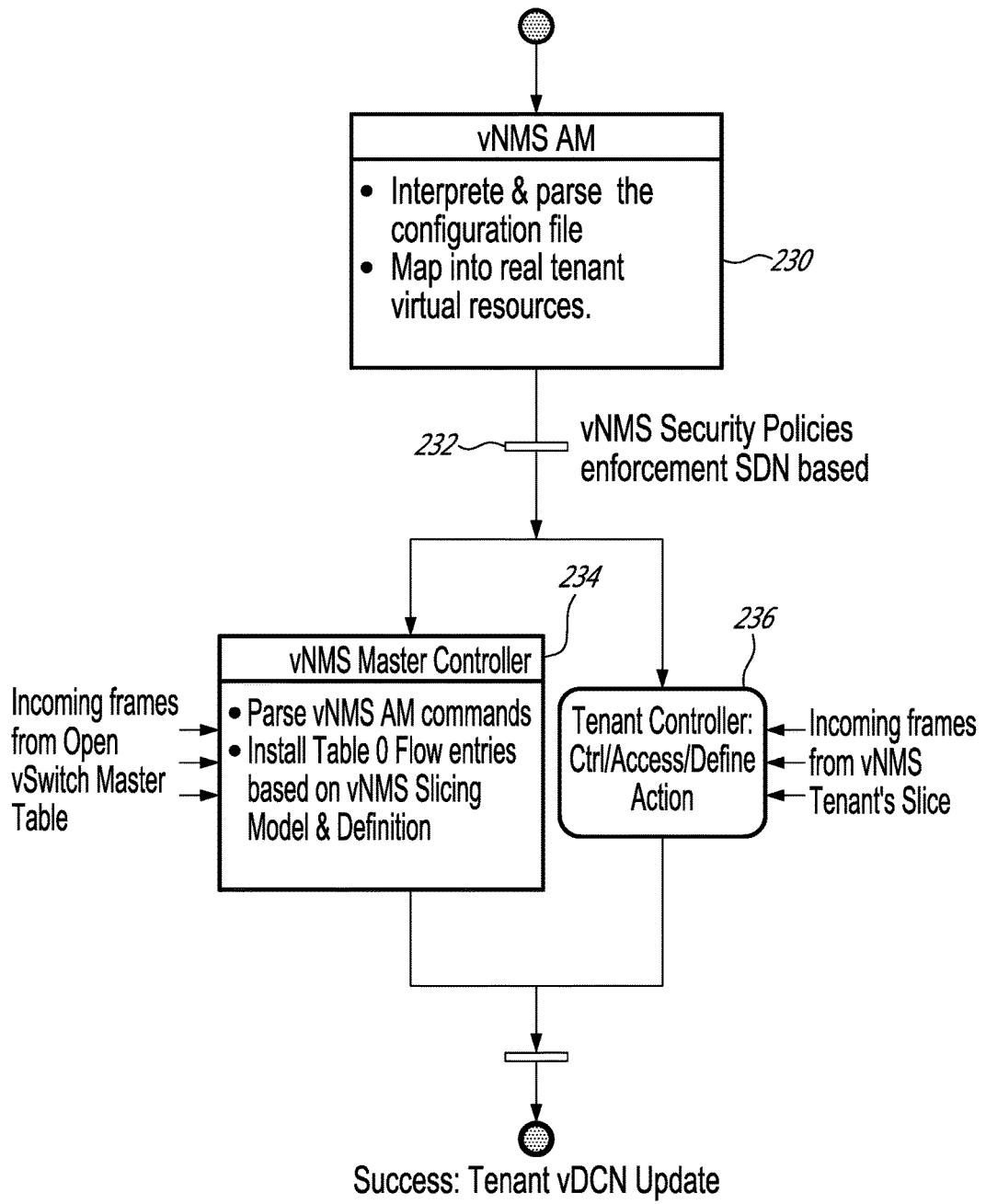
FIG. 7 illustrates an example vNMS slice configuration update.

FIG. 7 illustrates a description of a vNMS slice configuration update using the vNMS AM. The desired slice information can be entered into the vNMS AM. As discussed above, the vNMS AM parses the virtual slice configuration file and maps abstracted virtual resources to real virtual resources assigned to the tenant (block 230). The vNMS AM sends information to initialize and/or update the Master Controller and tenant controller configurations. The vNMS Master Controller receives incoming frames from the Open vSwitch Master Tables. The vNMS Master Controller parses the vNMS AM commands and installs Table 0 flow entries based on the vNMS slicing model and definition (block 234). The tenant controller receives incoming frames from the switches in the vNMS tenant's slice and determines what control, access and/or action is required for those frames (block 236). The tenant vDC is successfully updated when the new flow entries have been installed in the Open vSwitches from the Master Controller (Table 0) and in the Tenant Controllers (tenant tables).

Figure 8:
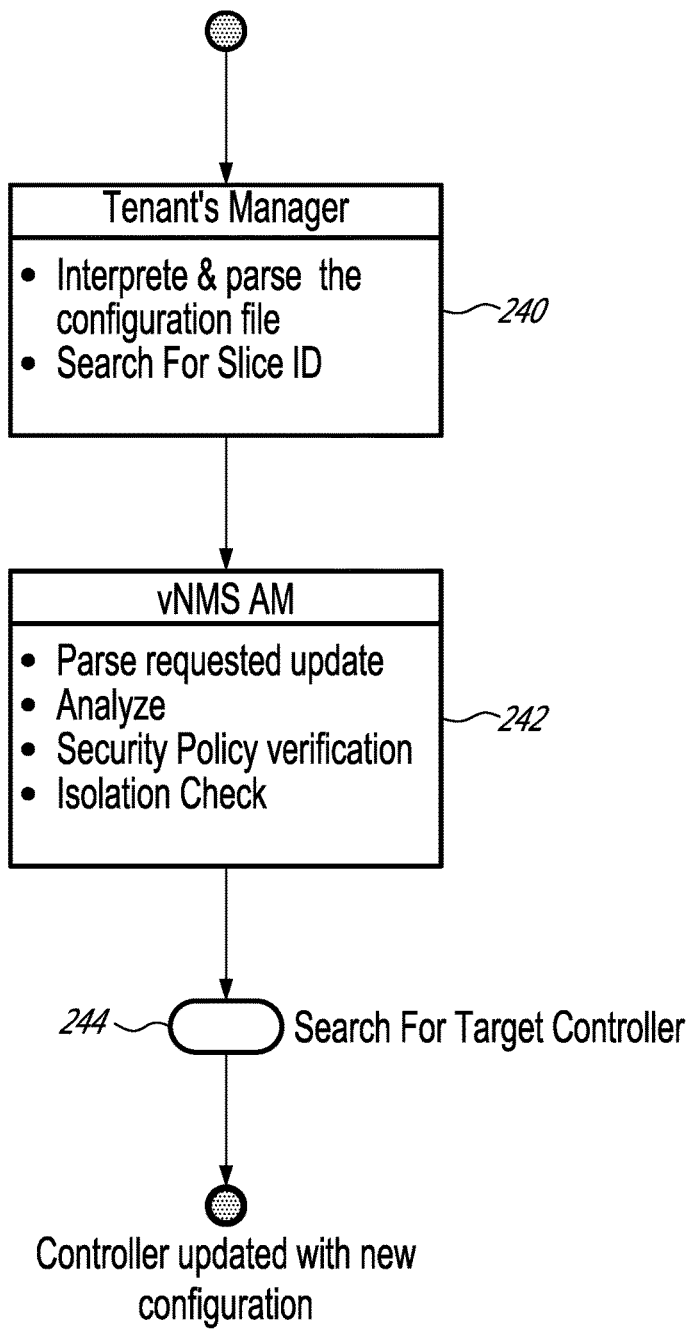
FIG. 8 illustrates a vNMS slice configuration update.

FIG. 8 illustrates a description of a vNMS slice configuration update by a tenant. A desired slice description is entered and received by the tenant's manager. In some embodiments, the tenant manager can be part of the vNMS AM which manages a particular tenant's slice. The tenant manager interprets and parses the virtual slice configuration file and searches for the Slice ID (block 240). An update is sent to the Master Controller. The vNMS AM parses and analyses the desired update (block 242). The vNMS AM can also perform a security policy verification and an isolation check. The update can be refused due to security policy and/or isolation violation. Otherwise, the target controller can be updated. The target controller is searched for (block 244) and sent the updated configuration information.

To achieve transparency, a tenant should have the full access to its own L2 tables (e.g. to add or delete rules). However, access can be limited due to a bad rule added to a shared table that might break the pipeline or change the flow behavior of all slices sharing that table. As a slice client can monitor shared resources (stat flow, port, table, etc.), a full isolation between tables need to be enforced. The vNMS Agent can control isolation at this level by denying the rules that result in flow paths intersections. As the vNMS slicing model depends on L2 isolation, VMs NIC configuration such as MAC address must be hidden to enforce the security model. For this purpose, the vNMS Autonomic Manager assigns each VM a name that is translated to/from the real VM configuration. Therefore the tenant can define the vNIC in the VM as for example VM1.vNIC1, VM1.vNIC2 etc. The real configuration remains untouched; it is completely transparent network administrator, virtual switch, and end-hosts. The tenant's management interface to the switch's tables can only manage Open Flow entries based on VM's assigned name. Real configuration management can be only reached by authorized entities. Therefore, a mapping table between VM name and MAC addresses can be added and maintained. The initial assignment of virtual VM names or virtual MAC addresses can be made by the vNMS Autonomic Manager. The mapping table access and changes can be managed by the vNMS Master Controller.

In an alternative embodiment, an Abstract MAC address (or an Alias MAC address) can be assigned to each VM's virtual NIC and a mapping between these Abstract MAC addresses and the real virtual NIC addresses can be maintained. The Abstract MAC address can be exposed to the tenant without exposing the actual MAC address of the VM(s). This allows the Data Center operator to modify the underlying virtual machines or resources without affecting the tenant's flows and policies. In other words, the Abstract MAC address is used as a pointer to a VM MAC address which can be dynamically configured.

Figure 9:
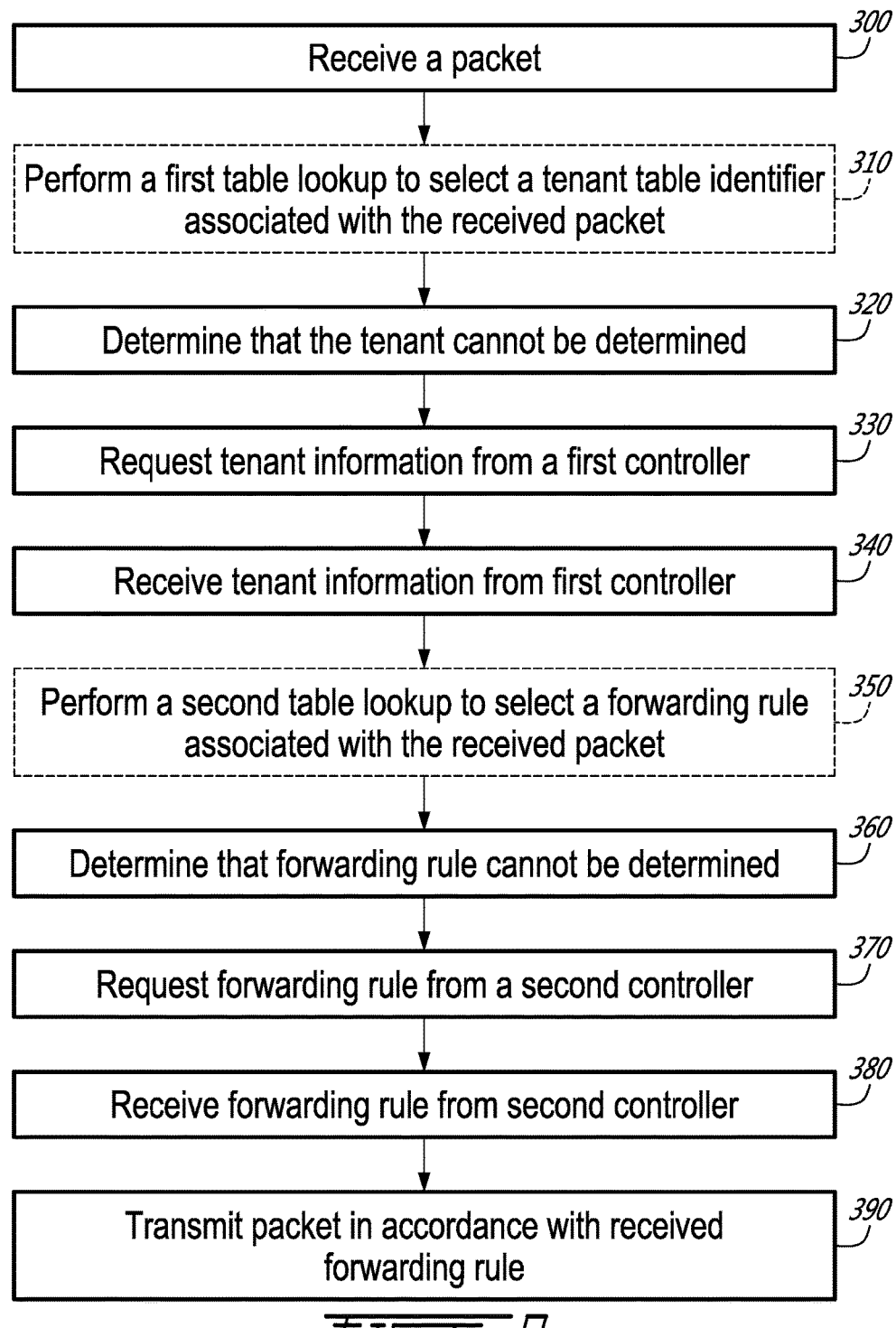
FIG. 9 is a flow chart illustrating a method for processing packet traffic in a multi-tenant network.

FIG. 9 is a flow chart illustrating a method for processing packet traffic in a multi-tenant network. The method can be performed by a networking element such as a switch or virtual switch as have been described herein. The method begins by receiving a packet (block 300). The switch optionally performs a lookup on a first table to identify a tenant associated with the received packet (block 310). The first table can be a master table (or table 0) that stores tenant information. In some embodiments the tenant information is a tenant table identifier that identifies the next table the received packet should be processed by. One or more packet header fields can be compared to the entries in the first table to identify a "match" or a successful lookup. In some embodiments, the first table lookup is performed in accordance with an input port on which the packet was received. The lookup of block 310 can select a tenant table identifier associated with tenant to which the received packet is associated with. In the case that the first table does not contain an entry corresponding to the received packet, it is determined that the tenant (and/or tenant information and/or tenant table identifier) cannot be determined (block 320).

In response to being unable to identify the tenant associated with the received packet, the switch requests tenant information from a first controller (block 330). The first controller can be a master SDN controller for the multi-tenant network. The switch can forward the packet (or a copy of the packet) to the first controller as part of the request. The switch subsequently receives the requested tenant information from the first controller (block 340). As described above, the tenant information can be an identifier of a tenant table that should next handle the packet. The tenant information can be added to and stored in the first table.

The switch can then pipeline the packet to a second table stored in the switch, the second table being associated with the tenant. The second table can be referred to as a tenant table. In some embodiments, the second table can be a tenant table identified in the tenant information received in block 340. In some embodiments, the second table is uniquely associated with the identified tenant. In other embodiments, the second table can be associated with, and shared between, a plurality of tenants. A second table lookup can be performed to select a forwarding rule, or a flow, associated with the received packet from the second table (block 350). In some embodiments, the second table lookup can be a Layer 2 lookup using the source and/or destination addresses of the received packet. If the flow has not been installed on the switch (i.e. there is no match for the packet in the second table), it is determined that the forwarding rule is not known (block 360). The forwarding rule can then be requested from a second controller (block 370), such as a tenant controller. The second controller can be uniquely associated with the identified tenant. The step of requesting the forwarding rule can include forwarding the packet (or a copy of the packet) to the second controller. The requested forwarding rule can be received from the second controller (block 380) and can be added to and stored in the second table.

At this point, the flow associated with the received packet is known (i.e. there is now a match for the source/destination addresses in the second table), and the next destination for the packet can be determined. The packet is transmitted in accordance with the received forwarding rule (block 390).

In some embodiments, the first and second controllers are distinct logical entities, each responsible for management tasks in their own domain. For example, the first controller can be a master SDN controller for the entire multi-tenant network. The master SDN controller can be configured to maintain a table of tenant identifiers which associate each packet or flow with a tenant. The master SDN controller can be configured to communicate the packet-to-tenant mapping to all switches in the network. In another example, the second controller is a tenant-specific SDN controller. The tenant controller can be configured to maintain one or more tables related to processing packets that are associated with that given tenant. The tenant controller can be configured to communicate the tenant table(s) to the switches that receive packet traffic associated with the tenant. In some embodiments, this can include all switches in the multi-tenant network. In other embodiments, this may only include a subset of the switches.

Mechanisms are provided which allow a switching element to request packet handling information from multiple sources in the network, depending on which type of information is required. A switch can communicate with a master controller to install tenant identifying rules. A switch can communicate with a tenant controller to install packet forwarding rules specific to that tenant.

Figure 10:
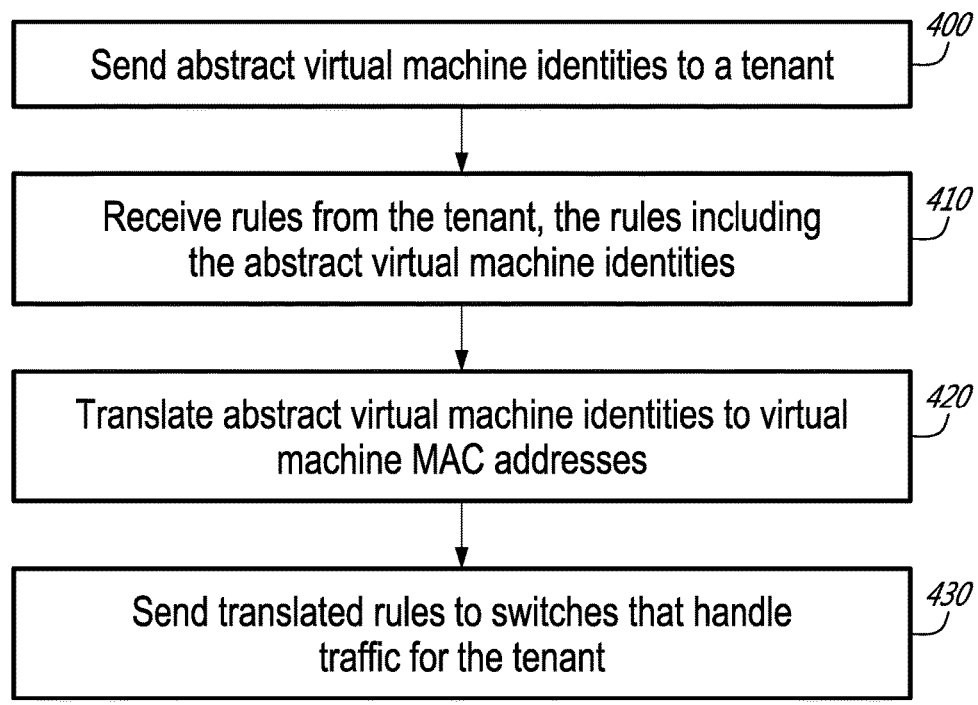
FIG. 10 is a flow chart a method for configuring a virtual slice.

FIG. 10 is a flow chart illustrating a method for configuring a virtual slice. The method can be performed by a network element such as the vNMS Master Controller as has been described herein. The controller sends abstract virtual machine identities or virtual MAC addresses to a tenant (block 400). The tenant can be an external client or customer. The data center operator and the tenant can communicate via an application programming interface, a customer-specific dashboard, a portal, or via any other alternate means. The controller maintains a mapping between the abstract virtual machine identities (communicated externally) and the actual virtual machine MAC addresses which are used internally in the data center.

The controller receives a set of rules or policies for packet handling from the tenant, the rules including at least some of the abstract virtual machine identities (block 410). As an example, the rules can be L2 policies related to service chaining, active and standby VM assignments, etc. The controller translates the abstract virtual machine identities or virtual MAC addresses included in the received rules into MAC addresses (block 420). The controller then pushes the translated rules to any switches (or virtual switches) associated with handling packet traffic for the tenant (block 430).

Figure 11:
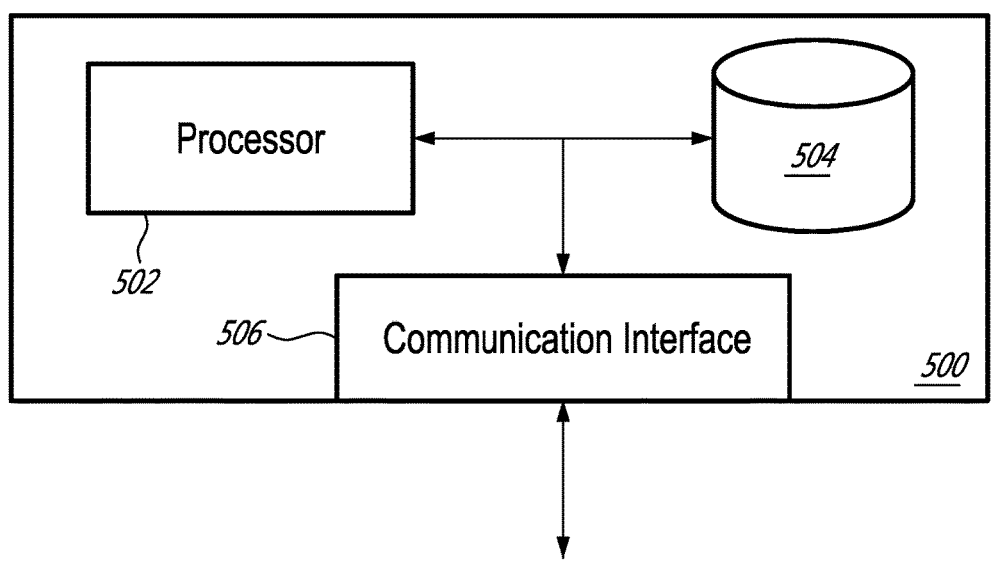
FIG. 11 is a block diagram of an example network element.

FIG. 11 is a block diagram illustrating an example network element 500 or forwarding element 500. The network element 500 can be a switch or virtual switch with underlying hardware resources, according to embodiments of the present invention. The switch 500 includes a processor 502, a memory or instruction repository 504 and a communication interface 506. The communication interface 506 can include at least one input port and at least one output port. The memory 504 contains instructions executable by the processor 502 whereby the switch 500 is operable to perform the various embodiments as described herein.

Memory 504 can store packet handling rules in one or more tables. These tables can include tenant identifying rules or information received from a master controller, via the communication interface 506, as well as packet forwarding rules received from at least one tenant controller, via the communication interface 506. A Master Table can be used to first de-multiplex incoming traffic between a number of tenants and to direct traffic to an identified tenant table. A Tenant Table can store packet handling/forwarding rules that are associated with the specific tenant and can be used to forward traffic to its next destination.

Switch 500 is configured to receive a packet. The packet can be received on a port at the communication interface 506. Responsive to determining that a tenant associated with the received packet cannot be determined, switch 500 requests tenant information from a first controller. The requested tenant information is subsequently received from the first controller and can be stored in memory 504. Responsive to determining that a forwarding rule associated with the received packet cannot be determined, switch 500 requests the forwarding rule from a second controller. The requested forwarding rule is subsequently received from the second controller. Switch 500 then transmits the packet in accordance with the received forwarding rule. The information requests and the packet transmission can be via the communication interface 506.

FIG. 12 is a block diagram of a switch 600 that can include a number of modules. Switch 600 can include a receiving module 602, a tenant identification module 604, a rule identification module 606, and a transmitting module 608. The receiving module 602 can be configured for receiving a packet. The tenant identification module 604 can be configured for requesting tenant information from a first controller in response to determining that a tenant associated with the received packet cannot be determined, and for receiving the requested tenant information from the first controller. The rule identification module 606 can be configured for requesting a forwarding rule from a second controller in response to determining that the forwarding rule associated with the received packet cannot be determined, and for receiving the requested forwarding rule from the second controller. The transmitting module 608 can be configured for transmitting the packet in accordance with the received forwarding rule.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for processing packet traffic by a switch in a multi-tenant network, comprising:
   receiving a packet;
   responsive to determining that a tenant associated with the received packet cannot be determined by a first table lookup, requesting tenant information from a first controller;
   receiving the requested tenant information from the first controller and installing the tenant information in the first table;
   responsive to determining that a forwarding rule associated with the received packet cannot be determined by a second table lookup, requesting the forwarding rule from a second controller;
   receiving the requested forwarding rule from the second controller and installing the forwarding rule in the second table; and
   transmitting the packet in accordance with the received forwarding rule;
   wherein the first controller is associated with a plurality of tenants in the multi-tenant network and the second controller is associated with one tenant of the plurality of tenants.

2. The method of claim 1, wherein the first controller is a master software defined networking (SDN) controller associated with the plurality of tenants in the multi-tenant network.

3. The method of claim 1, wherein the second controller is a tenant software defined networking (SDN) controller associated with the tenant.

4. The method of claim 1, wherein the tenant information is a tenant table identifier.

5. The method of claim 1, further comprising, performing the first table lookup to select a tenant table identifier associated with the received packet from the first table.

6. The method of claim 5, wherein the first table lookup is performed in accordance with an input port on which the packet was received.

7. The method of claim 1, wherein requesting tenant information includes sending the received packet to the first controller.

8. The method of claim 1, further comprising, storing the received tenant information as a flow entry in the first table.

9. The method of claim 1, further comprising, performing the second table lookup to select the forwarding rule associated with the received packet from the second table.

10. The method of claim 9, wherein the second table lookup is performed in accordance with at least one header field of the received packet.

11. The method of claim 10, wherein the at least one header field is selected from a group comprising: a source IP address, a destination IP address, a source port, a destination port, and a protocol.

12. The method of claim 1, wherein requesting the forwarding rule from a second controller includes sending the received packet to the second controller.

13. The method of claim 1, further comprising, storing the received forwarding rule as a flow entry in the second table.

14. The method of claim 1, wherein the first table is a master table associated with the plurality of tenants in the multi-tenant network.

15. The method of claim 1, wherein the second table is a tenant table uniquely associated with the tenant.

16. A switch in a multi-tenant network comprising a processor and a memory, the memory containing instructions executable by the processor whereby the switch is operative to:
   receive a packet;
   responsive to determining that a tenant associated with the received packet cannot be determined by a first table lookup, request tenant information from a first controller;
   receive the requested tenant information from the first controller and install the tenant information in the first table;
   responsive to determining that a forwarding rule associated with the received packet cannot be determined by a second table lookup, request the forwarding rule from a second controller;
   receive the requested forwarding rule from the second controller and install the forwarding rule in the second table; and
   transmit the packet in accordance with the received forwarding rule;
   wherein the first controller is associated with a plurality of tenants in the multi-tenant network and the second controller is associated with one tenant of the plurality of tenants.

17. The switch of claim 16, wherein the first controller is a master software defined networking (SDN) controller associated with the plurality of tenants in the multi-tenant network.

18. The switch of claim 16, wherein the second controller is a tenant software defined networking (SDN) controller associated with the tenant.

19. The switch of claim 16, wherein the tenant information is a tenant table identifier.

20. The switch of claim 16, further operative to perform the first table lookup to select a tenant table identifier associated with the received packet from the first table.

21. The switch of claim 20, wherein the first table lookup is performed in accordance with an input port on which the packet was received.

22. The switch of claim 16, wherein requesting tenant information includes sending the received packet to the first controller.

23. The switch of claim 16, further operative to store the received tenant information as a flow entry in the first table.

24. The switch of claim 16, further operative to perform the second table lookup to select the forwarding rule associated with the received packet from the second table.

25. The switch of claim 24, wherein the second table lookup is performed in accordance with at least one header field of the received packet.

26. The switch of claim 25, wherein the at least one header field is selected from a group comprising: a source IP address, a destination IP address, a source port, a destination port, and a protocol.

27. The switch of claim 16, wherein requesting the forwarding rule from a second controller includes sending the received packet to the second controller.

28. The switch of claim 16, further operative to store the received forwarding rule as a flow entry in the second table.

29. A switch comprising:
a receiving module for receiving a packet;
a tenant identification module for requesting tenant information from a first controller in response to determining that a tenant associated with the received packet cannot be determined by a first table lookup, and for receiving the requested tenant information from the first controller and installing the tenant information in the first table;
a rule identification module for requesting a forwarding rule from a second controller in response to determining that the forwarding rule associated with the received packet cannot be determined by a second table lookup, and for receiving the requested forwarding rule from the second controller and installing the forwarding rule in the second table; and
a transmitting module for transmitting the packet in accordance with the received forwarding rule;
wherein the first controller is associated with a plurality of tenants in the multi-tenant network and the second controller is associated with one tenant of the plurality of tenants.

* * * * *

UNITED STATES PATENT AND TRADEMARK OFFICE
CERTIFICATE OF CORRECTION

PATENT NO. : 9,912,582 B2
APPLICATION NO. : 14/546276
DATED : March 6, 2018
INVENTOR(S) : Pourzandi et al.

It is certified that error appears in the above-identified patent and that said Letters Patent is hereby corrected as shown below:

In the Specification

In Column 1, Line 60, delete "networking Network" and insert -- networking. Network --, therefor.

In Column 4, Line 21, delete "a" and insert -- of a --, therefor.

In Column 5, Line 31-32, delete "Overlay Virtual Networks (OVN)" and insert -- Open Virtual Networks (OVN) --, therefor.

In Column 7, Line 30, delete "DCNs. vNMS" and insert -- DCNs, vNMS --, therefor.

In Column 8, Line 12, delete "network. vNMS" and insert -- network, vNMS --, therefor.

Signed and Sealed this
Twenty-second Day of September, 2020

Andrei Iancu
*Director of the United States Patent and Trademark Office*